J. A. WALTMAN.
ROTARY MULTIPLE CYLINDER INTERNAL COMBUSTION ENGINE.
APPLICATION FILED JAN. 26, 1910.
975,485.
Patented Nov. 15, 1910.
4 SHEETS—SHEET 3.
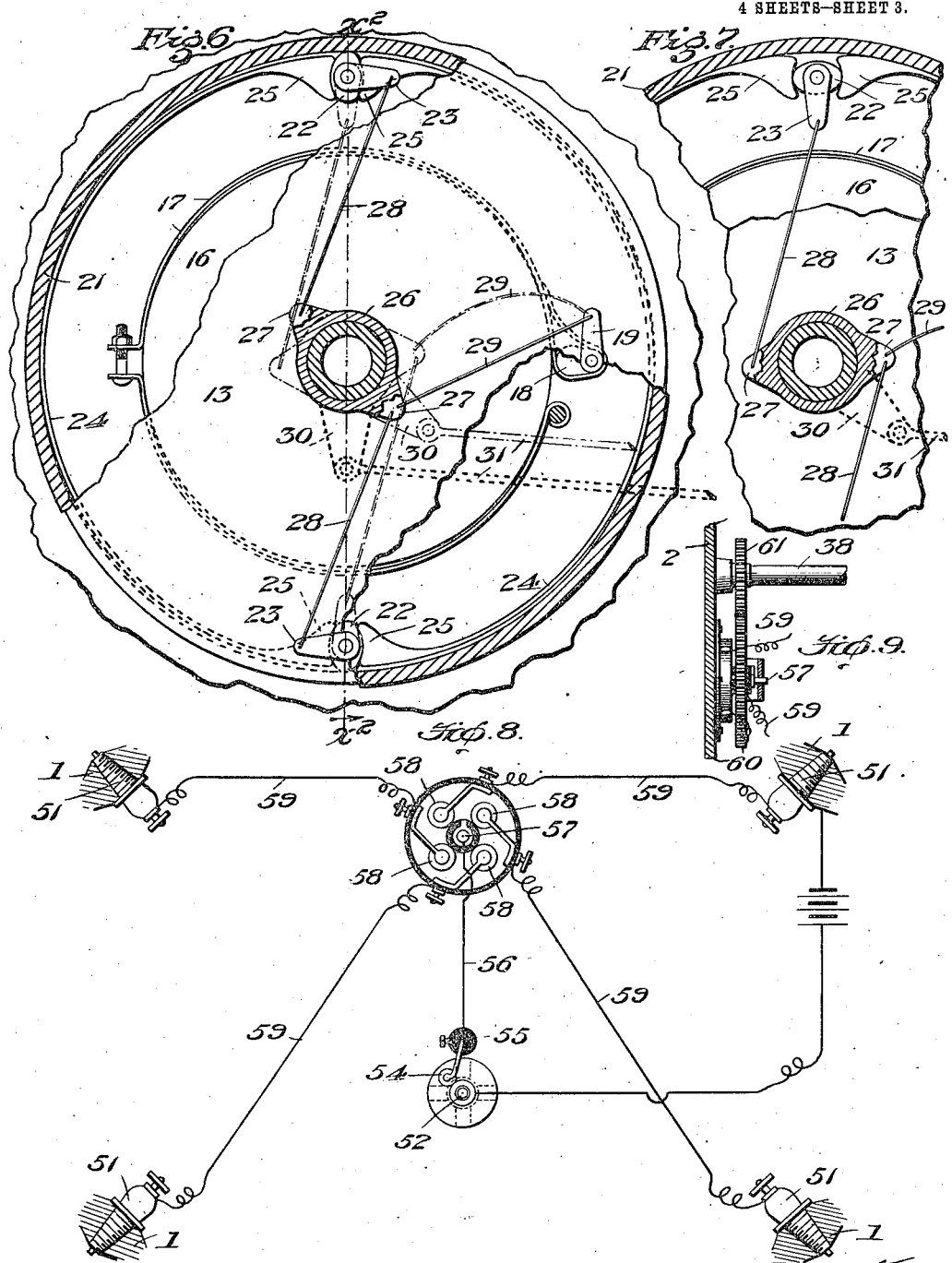
Witnesses:
Inventor
J. A. Waltman

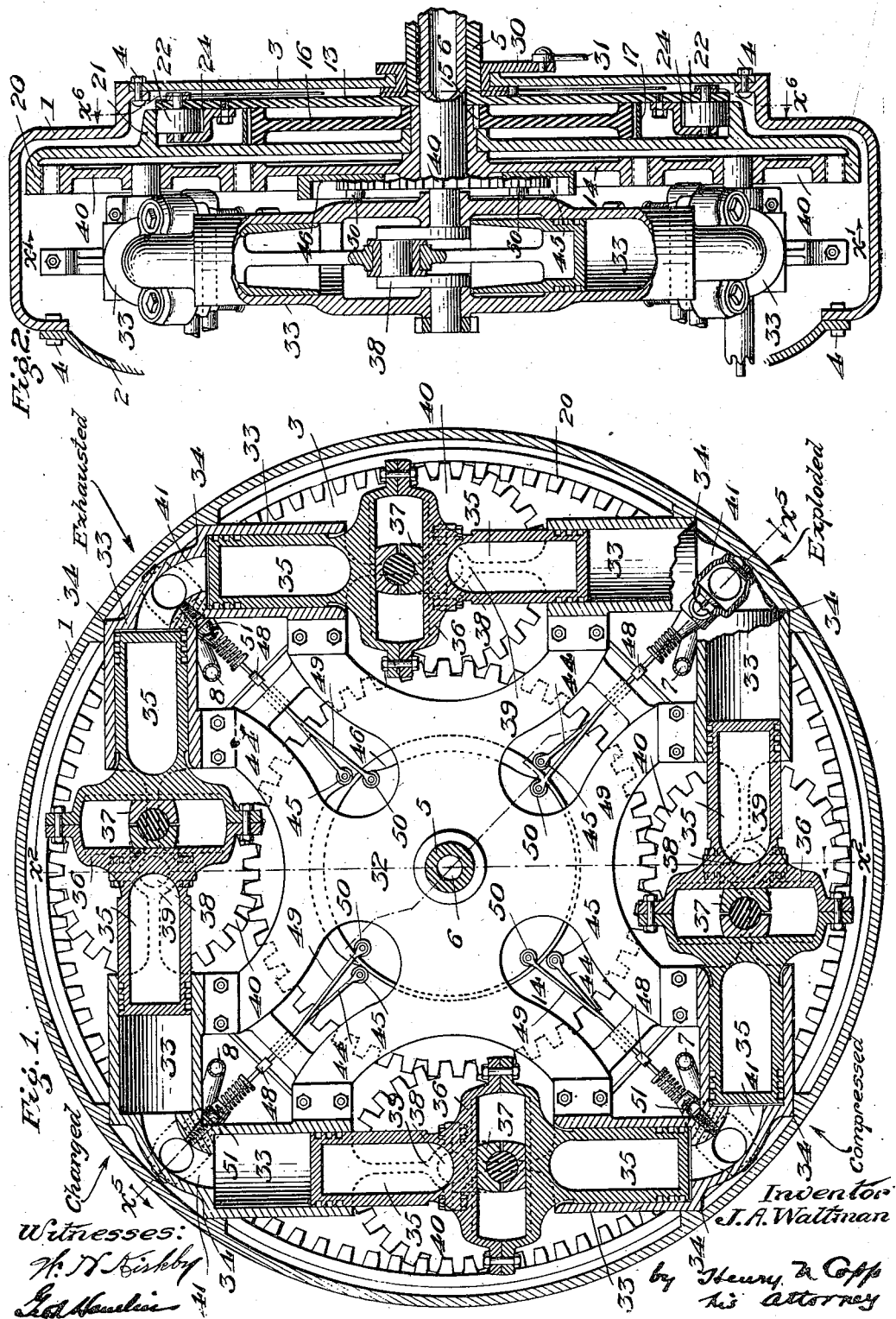

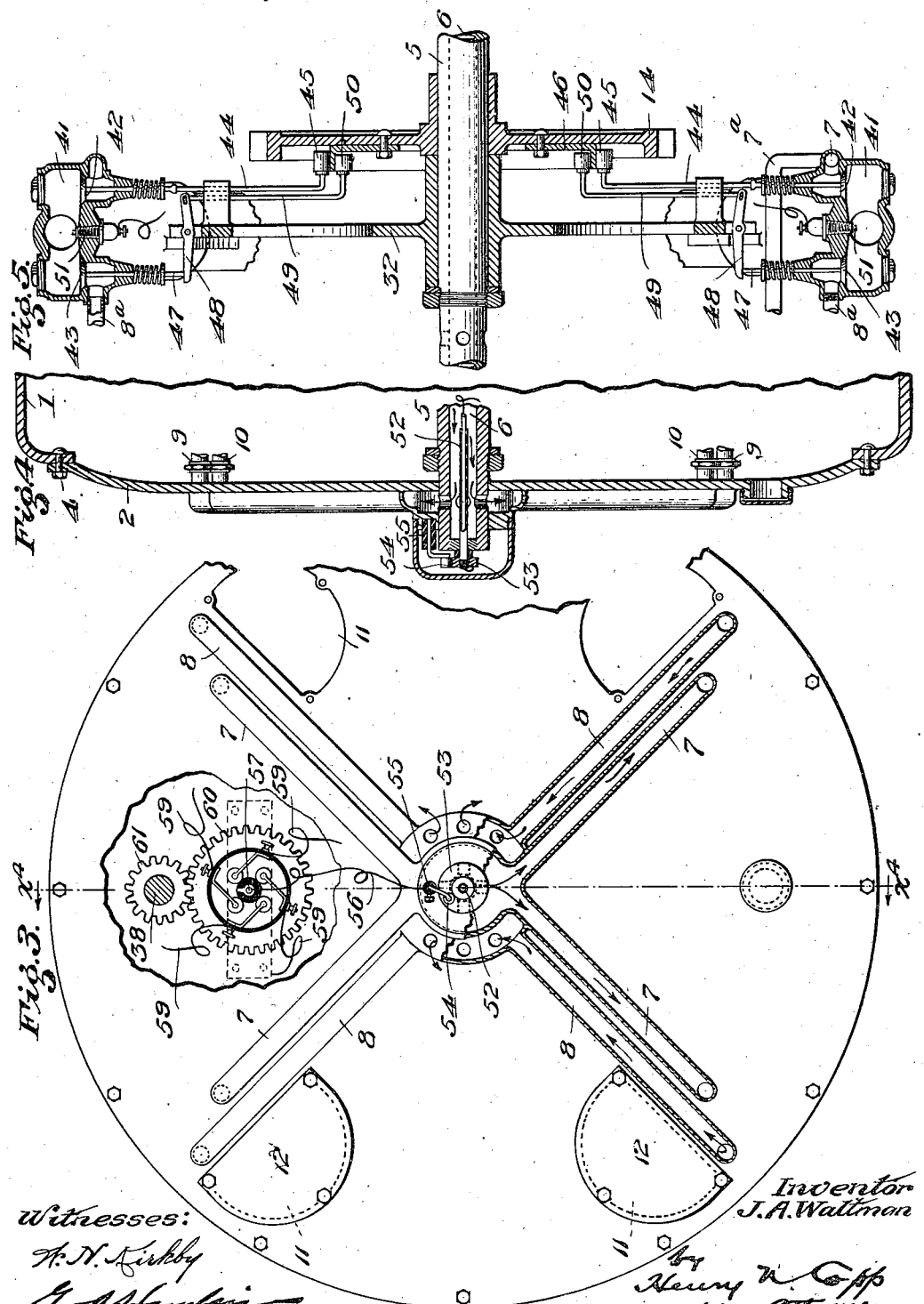

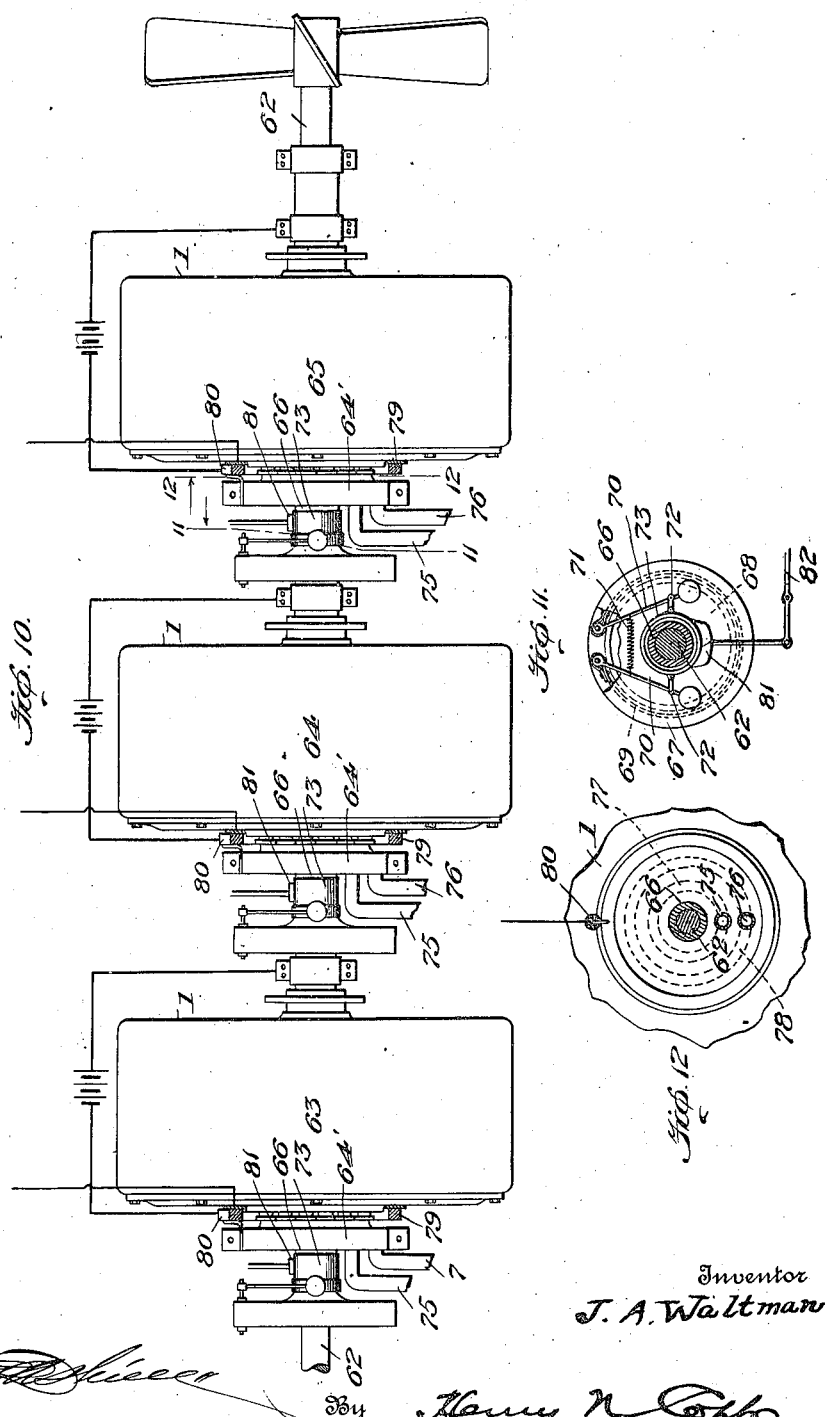

UNITED STATES PATENT OFFICE.

JOHN A. WALTMAN, OF LOS ANGELES, CALIFORNIA.

ROTARY MULTIPLE-CYLINDER INTERNAL-COMBUSTION ENGINE.

975,485.

Specification of Letters Patent. Patented Nov. 15, 1910.

Application filed January 26, 1910. Serial No. 540,199.

*To all whom it may concern:*

Be it known that I, JOHN A. WALTMAN, a citizen of the United States, residing at Los Angeles, county of Los Angeles, and State of California, have invented certain new and useful Improvements in Rotary Multiple-Cylinder Internal-Combustion Engines, of which the following is a specification.

This invention relates to rotary multiple cylinder internal combustion engines.

The present invention has for its object the provision of an internal combustion engine of novel construction which is particularly adapted to be carried by a traction wheel for use with vehicles of all kinds, although also intended for use as a self-contained rotary internal combustion engine.

The invention contemplates the provision of a novel self-contained internal combustion engine having a plurality of cylinders, gears, brakes, valve motions and controls, and other features combined in a new manner, providing an internal combustion engine which can be started, stopped, and reversed by the same controlling lever or its equivalent, which has its power pulley or traction wheel so that it is adapted for use as a self-contained driving tractive wheel for vehicles or as a self-contained driving rotary engine.

In another aspect, the invention contemplates the provision of one or more, preferably a plurality, of self-contained rotary internal combustion engines adapted to turn a power shaft, having automatic governor controlled clutch devices, whereby the driving of the shaft from the different engines may be controlled and which permits any one of the engines being unclutched, from the shaft when under full speed, without injury or disturbing the remaining engines, thereby specially adapting the invention to propeller shafts as any number of engines may thus be used in connection with the same shaft and the power applied thereto instantly regulated as may be found necessary.

Certain embodiments of the invention are set forth hereinafter and in the accompanying drawings, in which—

Figure 1 is a vertical section on line $x'$—$x'$ of Fig. 2; Fig. 2, a vertical section taken generally on the line $x^2$—$x^2$ of Fig. 1, but showing the right hand set of cylinders and pistons of Fig. 1 broken away. Fig. 3, an elevation, partly in section and broken away, looking toward the left of Fig. 2; Fig. 4, a vertical section on line $x^4$—$x^4$ of Fig. 3 with the timer and certain parts omitted; Fig. 5, a section on line $x^5$—$x^5$ of Fig. 1, showing the valve gear; Fig. 6, a section on line $x^6$—$x^6$ of Fig. 2; Fig. 7, a detail view of a part of Fig. 6; Fig. 8, a diagram of the sparking and timer circuits; Fig. 9, a detail view showing how the timer is mounted on the shell or casing; Fig. 10, a view of a modification showing how a plurality of the engines can be applied to the same power shaft, such as a propeller shaft; Fig. 11, a detail section on line 11—11 of Fig. 10; and Fig. 12, an enlarged detail section on line 12—12 of Fig. 10.

As illustrated in Figs. 1 to 5, inclusive, the invention is shown as adapted for use as a self-contained traction wheel for vehicles, but it will be understood that it is, as illustrated, just as well adapted for use as a self-contained rotary engine, serving as its own pulley.

The shell or casing is composed of a tread or pulley part 1 and side plates 2 and 3, all suitably fastened together at 4, affording convenience of access to the interior mechanism. Any suitable tire or facing may be applied to the part 1 or to any extension thereof.

The entire motor structure revolves on a, preferably, stationary shaft or axle 5 which has a conduit 6 for the admission of the gasolene and air mixture which passes into intake pipes or channels 7 cast integral with or carried by the face plate 2, while exhaust pipes or channels 8 take off the exhaust from the engine cylinders, the respective pipes 7 and 8 being connected to short pipes $7^a$ and $8^a$ leading to the controlling valves by pipe couplings 9 and 10, and adjacent to these couplings, the plate 2 is provided with hand holes 11 having suitable covering plates 12 so that the couplings 9 and 10 can be readily detached prior to disconnection of the face plate 2 when access to the cylinders is necessary.

Keyed on the shaft 5 is a plate or disk 13, and there is loosely mounted on said shaft an external gear 14 to which is keyed at 15 a friction brake disk 16, around which is a friction strap 17, which is controlled by an eccentric tightener having an arm 19. Loose on the hub of the gear 14 is an internal gear 20 which on one side is provided with an annular friction flange 21. Carried by the disk 13 are diametrically opposite cams 22, each of which has an arm 23. Contained within the annular friction flange 21 are similar semi-circular friction straps 24 having heads 25 disposed on opposite sides of the respective cams 22 so that on turning said cams 22, the heads 25 will be wedged apart and the friction straps 24 thrown into strong frictional engagement with the friction flange 21.

Journaled upon the hub of the disk 13 and itself forming a bearing for the plate 3, is a rocker 26 having arms 27 at its opposite sides which are respectively connected by rods 28 to the arms 23 so that whichever way the rocket 26 may be turned, the cams 22 will be simultaneously operated. When the rocker is in the position shown by full lines in Fig. 6, the friction straps 24 are loose, but when turned to the dotted line position of Fig. 6, and the full line position of Fig. 7, the friction straps or bands 24 are extended into firm contact with the friction flange 21 so that the disk 13 and the internal gear 20 are in effect one. One of the arms 27 is also connected to the arm 19 by a rod 29. The rocker 26 has an arm 30 which is connected by a rod 31 to any suitable controlling lever. When the controlling lever is in a position where the rocker 26 is in the position shown in full lines in Fig. 6, the strap 24 is loose and the strap 17 is tight so that the operation of the engines will cause the shell or casing 1 to run in one direction as will presently appear. When the lever is shifted to bring the rocker 26 to the dotted line position of Fig. 6 and the full line position of Fig. 7, the strap 24 is tightened and the strap 17 is loosened so that the motion of the engine causes the shell or casing 1 to revolve in the opposite direction. When the controlling lever is so positioned that the rocker 26 will assume a position intermediate its two former positions, both the straps 17 and 24 will be loose and the shell or casing will remain stationary.

Loosely mounted on the shaft 5 is a spider 32 (Figs. 1 and 5) to which are bolted the sets of cylinders 33, which in turn are engaged with the shell or casing 1 at 34, and thus the spider, the cylinders, and the shell or casing always rotate together. The pistons 35 are connected in pairs by yokes 36 which contain sliding cross-heads 37 on cranks 38 journaled in frame-parts 39 and carrying pinions 40, which mesh with both the gears 14 and 20. Each pair of cylinders 33 is provided with a common explosion chamber 41 (Figs. 1 and 5) to which the intake and exhaust pipes 7ª and 8ª lead, but are controlled by intake and exhaust valves 42 and 43. The stems 44 of the valves 42 are provided with rollers 45 engaging with one side of a cam 46 secured to the face of the gear 14. The stems 47 of the valves 43 operate in connection with levers 48 which are moved by stems 49 carrying rollers 50, which coöperate with the other side of the cam 46. The cam profiles are so constructed, as shown in Fig. 1, that two of the cylinders are receiving their charge while in another pair the charge is being compressed, in a succeeding pair it is being exploded, and in the final pair, the products of the explosion are being exhausted. Each explosion chamber 41 is provided with a sparker 51.

As shown in Figs. 3 and 4, the electric conductor 52 extends through the conduit 6 and out through the end thereof, insulated therefrom, being there provided with a metal collector 53 which is engaged by a roller brush 54 carried by insulation 55 on the face plate 2 and from which a circuit wire 56 leads to the metal center 57 of a timer (Figs. 3 and 8) whose collectors or brushes 58 are connected by circuit wires 59 to the different spark plugs 51. As shown in Figs. 3 and 9, the metal center 57 is secured to, but insulated from, a gear 60, which is driven by a pinion 61 on one of the engine shafts 38.

The general operation is as follows: The gasolene charge entering through the conduit 6 of stationary shaft 5, is fed to the different explosion chambers 41 by the intakes 7. At the proper time, the timer causes the spark to pass at the given spark plug and the charge is exploded, the intake and exhaust valves 42 and 43 being timed in their operations by the cam 46. While one set of cylinders is being charged, another set is compressing the charge and the succeeding set is receiving the exploded charge to drive the pistons thereof, which in turn, rotate the pinions 40 and, according to the position of the controlling lever, the shell or casing 1 is stationary, rotates forward or backwardly. The next set of cylinders is at the same time exhausting. The disk 13 being always stationary, if the controlling lever is moved so that the strap 24 is thrown against the friction flange 21, the otherwise loose internal gear 20 is also made stationary so that the action of the pinions 40 on said internal gear 20 causes the shell or casing 1 to revolve in one direction. On the other hand, if the controlling lever is shifted so that the strap 17 is tightened on the disk 16, the said disk being coupled to the gear 14, the gear 14 is held stationary with the disk and the rotation of the pinions 40 causes the shell or casing 1 to revolve in the opposite direction. If both of the straps 17 and 24 are loose, the gears 14 and 20 are revolved idly by the engine and there is no forward or reverse movement whatever of the shell or casing 1.

Referring to Figs. 10, 11 and 12, I have here shown how a plurality of the engines can be used to collectively or individually drive a power shaft, particularly a propeller shaft 62. The respective engines are shown at 63, 64 and 65, each having a rotary outer shell or casing 1 which is loosely mounted on the shaft 62, but to which is secured a sleeve 66 having an integral or connected shell 67 loosely surrounding a disk 68 secured to the shaft 62. Carried by the shell 67 is a friction strap 69 which is tightened or loosened by eccentrics to which are attached the governor arms 70 connected by a spring 71, and in turn connected by links 72 to a band or sleeve 73 which loosely surrounds the sleeve 66. A stationary head 64' loosely surrounds the sleeve 66 and is provided with intake and exhaust pipes 75 and 76 which communicate with circular channels 77 and 78 in the head 74, which in turn always communicate with the sets of intake and exhaust pipes of the different cylinders so that at all times the cylinders can receive the explosive mixture or exhaust the exploded charge. The shell 1 carries a collector ring 79 with which a brush or collector 80 secured to the head 74 contacts, whereby the current is supplied to the spark timer. A brake-shoe 81 operated by a suitable lever 82, is adapted to bear upon the sleeve 73 and force it to one side and thereby, through the links 72, draw the governor arms 70 together and release the friction strap 69 from the disk 68. In this form of the invention, the operation of the engines is as previously described. Assuming that the shell 1 is in rotation in either direction, the shell 67 is turning with it and the centrifugal action throws out the governor arm 70, thereby causing the friction strap 69 to engage the friction disk 68 to impart motion to the shaft 62 and the faster the engine rotates, the greater is the frictional engagement. Each of the engines 63, 64 and 65 is susceptible of independent control so that as many of these engines as desired may be made to operate on the shaft 62, but if for any cause it is desired to cut out any engine, the same can be stopped, although an immediate release can be obtained by applying the brake-shoe 81 to thereby release the friction strap 69 from the disk 68, this being possible at full speed.

Having thus described my invention, what I claim as new, and desire to secure by Letters Patent, is:—

1. In an engine, the combination with a rotary wheel, of concentric gears mounted for rotation independently of each other and independently of the wheel, a motor carried by the wheel, a pinion meshing with said concentric gears and operated by the motor, and operable means for holding either of said concentric gears against rotation.

2. In an engine, the combination with a rotary wheel, of concentric gears mounted for rotation independently of each other and independently of the wheel, operable means for holding either of said concentric gears against rotation, a plurality of cylinders carried by said wheel, a plurality of pistons for said cylinders, and a plurality of pinions carried by the wheel and engaged with the gears and operated by the respective pistons.

3. In an engine, the combination with a rotary wheel, of concentric gears mounted for rotation independently of each other and independently of the wheel, operable means for holding either of said concentric gears against rotation, a plurality of cylinders carried by said wheel, a plurality of pistons for said cylinders, a plurality of pinions carried by the frame and engaged with the gears and operated by the respective cylinders, means for supplying motive fluid pressure to said cylinders and exhausting it therefrom, and valve mechanism for controlling the admission and exhaust of the motive fluid pressure to said cylinders.

4. In an engine, the combination with a rotary wheel, of concentric gears mounted for rotation independently of each other and independently of the wheel, operable means for holding either of said concentric gears against rotation, a motor carried by the wheel, a pinion engaged with the gears aforesaid, a cam, valve mechanism operated by the cam controlling the supply and exhaust for the motor aforesaid, and a source of motive fluid pressure supply for the motor.

5. In an engine, the combination with a rotary wheel, of concentric gears mounted for rotation independently of each other and independently of the wheel, operable means for holding either of said concentric gears against rotation, a plurality of motors carried by the wheel, a plurality of pinions carried by the wheel and engaged with the gears aforesaid and operated by the respective motors, supply and exhaust valve gear for the respective motors, cams for operating the valve gear in sets, and a source of motive fluid pressure supply leading to the respective motors.

6. In an engine, the combination with a rotary wheel, of concentric gears mounted for rotation independently of each other and independently of the wheel, operable means for holding either of said concentric gears against rotation, a cam valve controller carried by one of said gears, a plurality of motors carried by the wheel, valve mechanism for the respective motors operated by the cam aforesaid for controlling the supply and exhaust for the motors, and a source of motive fluid supply for the respective motors.

7. In an engine, the combination with a rotary wheel, of concentric gears mounted for rotation independently of each other and independently of the wheel, braking devices for the respective gears, means for simultaneously operating said braking devices to hold either one of the gears stationary or to release both of them so that they will run free, a motor carried by the wheel, a pinion engaged with the gears aforesaid and operated by the motor, and means for operating the motor.

8. In an engine, the combination with a rotary wheel, of concentric gears mounted for rotation independently of each other and independently of the wheel, independent friction strap brakes for the said gears, means for simultaneously operating said strap brakes to hold either of the gears stationary or to release both of them so that they will run free, a motor carried by the wheel, a pinion meshing with the concentric gears and operated by the motor, and means for operating the motor.

9. In an engine, the combination with a rotary wheel, of concentric gears mounted for rotation independently of each other and independently of the wheel, friction strap brakes for the respective gears, a rocker having operative connections to the respective strap brakes, and means for moving the rocker, said rocker and connections being so arranged that either of the strap brakes may be applied to hold either gear stationary or both may be released to allow the gears to run free, a motor carried by the wheel, and means for operating the motor.

10. In an engine, the combination with a rotary wheel, of concentric gears mounted for rotation independently of each other and independently of the wheel, a plurality of engines carried by the wheel and arranged with their cylinders grouped and fed in pairs from the same source, valve gear for the respective groupings so that connected cylinders are simultaneously fed or exhausted, pinions operated by the respective engines and meshing with the concentric gears, and operable means for holding either of said concentric gears against rotation.

11. In an engine, the combination with a rotary wheel, of concentric gears mounted for rotation independently of each other and independently of the wheel, a plurality of engines carried by the wheel, each engine being composed of a plurality of cylinders, connected pistons working in the cylinders of each engine, pinions meshing with the concentric gears and operated by the respective connected pistons, a valve chest connecting a cylinder of each engine with the corresponding cylinder of another engine of the set, valve gear for each connected set of cylinders for simultaneously controlling the supply and exhaust therefor, means for operating said valve gear, and operable means for holding either of the concentric gears against rotation.

12. In an internal combustion engine, the combination with a rotary wheel, of concentric gears mounted for rotation independently of each other and independently of the wheel, operable means for holding either of said concentric gears against rotation, a plurality of internal combustion engines carried by the wheel, each of said engines being composed of a plurality of cylinders, the different engines being arranged so that corresponding cylinders have a common explosion chamber, charge exploding means for each explosion chamber, intake and exhaust pipes for each explosion chamber, means for supplying the gasolene charge to the said explosion chambers, independent intake and exhaust valves for each explosion chamber, a cam device carried by one of said gears and adapted for operating said valves, coupled pistons operating in the cylinders of each engine, and meshing with the gears aforesaid and operated by the respective coupled pistons.

13. In an engine, the combination with a power shaft, of a plurality of engines each composed of a rotary wheel, concentric gears mounted for rotation independently of each other and independently of the wheel, a motor, a pinion meshing with said concentric gears and operated by the motor, operable means for holding either of said concentric gears against rotation, and independent clutches for connecting and disconnecting the respective engines to the said power shaft.

14. In an engine, the combination with a power shaft, of a plurality of engines each composed of a rotary wheel, concentric gears mounted for rotation independently of each other and independently of the wheel, a motor carried by the wheel, a pinion meshing with said concentric gears and operated by the motor, operable means for holding either of said concentric gears against rotation, and automatic centrifugally controlled clutches for coupling the respective engines to the said shaft when they are in operation.

15. In an engine, the combination with a power shaft, of a plurality of engines each composed of a rotary wheel, concentric gears mounted for rotation independently of each other and independently of the wheel, a motor carried by the wheel, a pinion meshing with said concentric gears and operated by the motor, operable means for holding either of said concentric gears against rotation, independent automatic governor controlled clutches for coupling the respective engines to the shaft when they are in motion, and braking devices for the respective clutches for releasing them from the shaft independently of the control of the engines themselves.

16. In an engine, the combination with a rotary wheel, of concentric gears mounted for rotation independently of each other and independently of the wheel, a motor, a pinion meshing with said concentric gears and operated by the motor, and operable means for holding either of said concentric gears against rotation.

17. In an engine, the combination with a rotary wheel, of concentric gears mounted for rotation independently of each other and independently of the wheel, operable means for holding either of said concentric gears against rotation, an engine comprising a plurality of cylinders and a plurality of pistons for said cylinders, and a plurality of pinions engaged with the gears and operated by the respective pistons.

18. In an internal combustion engine, the combination with a rotary wheel, of concentric gears mounted for rotation independently of each other and independently of the wheel, an internal combustion engine, a pinion meshing with said concentric gears and operated by the engine, operable means for holding either of said concentric gears against rotation, a timer rotatable with the wheel and operated by the engine, a sparker for the engine which is controlled by the timer, and a collector included in the electric circuit of the timer, said collector having one of its parts carried by the wheel and its other part stationary.

In testimony whereof, I hereunto affix my signature in presence of two witnesses.

JOHN A. WALTMAN.

Witnesses:
WM. C. SHIELD,
GEO. N. HAMLIN.